United States Patent [19]
McPherson

[11] 3,872,501
[45] Mar. 18, 1975

[54] DRIVE FOR A LINEAR PLAY ADAPTER FOR A CASSETTE TAPE RECORDER

[75] Inventor: Donald F. McPherson, Hilton, N.Y.

[73] Assignee: Tapecon, Inc., Rochester, N.Y.

[22] Filed: May 24, 1973

[21] Appl. No.: 363,320

[52] U.S. Cl. .......... 360/2, 360/88
[51] Int. Cl. .......... G11b 25/04, G11b 23/04
[58] Field of Search .......... 360/2, 15, 94, 88; 235/61.11 D; 274/4 J

[56] References Cited

UNITED STATES PATENTS

| | | | |
|---|---|---|---|
| 3,584,882 | 6/1971 | Krtous | 360/2 |
| 3,678,212 | 7/1972 | Wild | 360/2 |
| 3,800,315 | 3/1974 | Budrose | 360/2 |
| 3,800,321 | 3/1974 | Bolick, Jr. | 360/94 |

*Primary Examiner*—Raymond F. Cardillo, Jr.
*Assistant Examiner*—Jay P. Lucas
*Attorney, Agent, or Firm*—Cumpston, Shaw & Stephens

[57] ABSTRACT

A drive train takes power from the capstan of a host tape recorder to drive an adapter such as for flat cards, etc. A driven element of the drive has a shaft, an elastomeric hub, and a cylindrical elastomeric rim extending downward and having an inside surface engaging the capstan. A rigid cylindrical sleeve around the outside of the elastomeric rim is engaged by the pinch roller of the host recorder, and the driven element turns a drive train that operates the adapter.

10 Claims, 2 Drawing Figures

PATENTED MAR 18 1975 3,872,501

DRIVE FOR A LINEAR PLAY ADAPTER FOR A CASSETTE TAPE RECORDER

THE INVENTIVE IMPROVEMENT

There have been several attempts at adapters attachable to a cassette tape recorder host machine for playing and recording in a different mode such as on linear tracks on cards and the like. To achieve fidelity and reasonable playing time it is important that such a take-off drive be relatively steady and vibration free. Furthermore, the drive should be simple, economical and reliable, and these requirements have made the adapters drives very troublesome.

The invention involves recognition of all the needs and difficulties involved in adapter drives, and the invention proposes a simple, effective, and reliable drive operated from the capstan of the host tape recorder. The invention also aims at economy, reliability, efficiency and vibration-free smoothness in an adapter drive.

SUMMARY OF THE INVENTION

The inventive drive is for an adapter for a cassette tape recorder having a capstan and a pinch roller. It includes a driven element with a shaft, an elastomeric hub extending radially outward from the shaft, and a cylindrical, elastomeric rim extending axially from the hub and having an inside surface extending along a substantial length of the capstan. A substantially rigid cylindrical sleeve extends around the outside of the elastomeric rim and is engaged by the pinch roller of the host tape recorder to press the inside surface of the rim against the capstan to rotate the driven element with the capstan. The driven element turns drive means that operates the adapter.

DRAWINGS

FIG. 1 is a partially cut-away plan view of a preferred embodiment of the invention drive; and FIG. 2 is a cross sectional view of the embodiment of FIG. 1 taken along the line 2 — 2 thereof.

DETAILED DESCRIPTION

Figure 1:
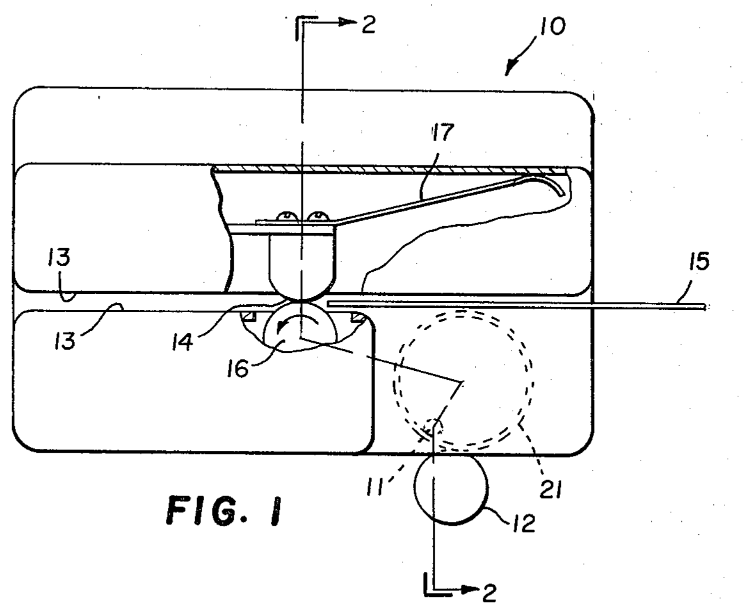
Figure 2:
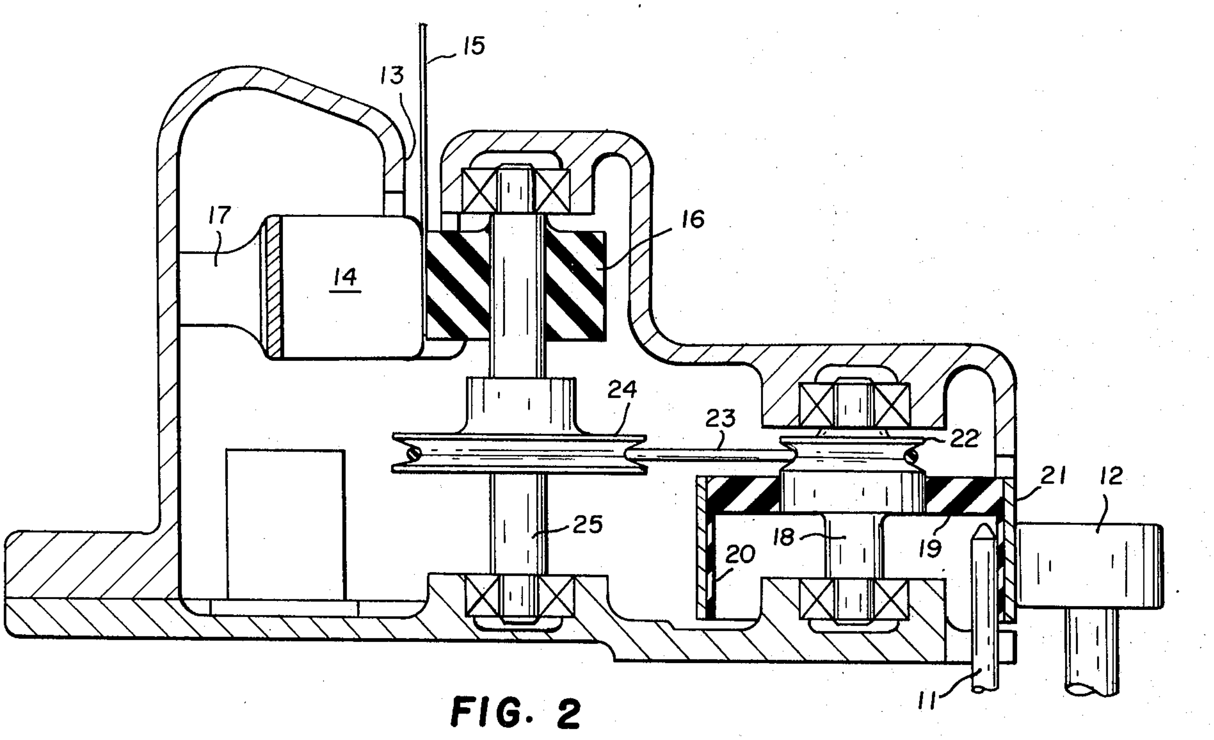

Adapter 10 is shaped to fit the cassette slot of a host tape recorder represented in the drawings by capstan 11 and pinch roller 12. Pinch roller 12 is movable toward and away from capstan 11 and is biased against capstan 11 during record and play to press a cassette tape against capstan 11 to regulate the tape speed. Cassette tape recorders normally have capstan 11 and pinch roller 12 and may differ in many other details.

Adapter 10 has a linear slot 13 through which a flat card 15 can pass for moving a linear magnetic recording track along the length of slot 13 for recording or playing back brief messages. Card 15 can have many shapes and sizes, and can be a punched card, photograph, or other document bearing a linear magnetic recording strip.

Magnetic head 14 extends into slot 13 to engage card 15 for recording or playing back. A friction roller 16 opposite magnetic head 14 also extends into slot 13 to engage card 15 and advance it past magnetic head 14 to transverse slot 13. Magnetic head 14 is movable transversely of slot 13 and is biased into engagement with friction roller 16 by supporting spring 17. The invention involves an improved drive mechanism from capstan 11 to friction rolller 16 as described below.

An element driven by capstan 11 has a shaft 18, an elastomeric hub 19 extending radially outward from shaft 18, and an elastomeric rim 20 extending axially downward from hub 19 in cylindrical shape having an inside surface extending along a substantial length of capstan 11. A rigid cylindrical sleeve 21 extends around the outside of rim 20 and is preferably formed of metal to support rim 20 in a cylindrical shape. In practice, the driven element is preferably formed by arranging shaft 18 and sleeve 21 in a mold and vulcanizing rubber in the mold to form hub 19 and rim 20 joining sleeve 21 to shaft 18 in an integral unit such as illustrated. Elastomeric hub 19 affords radial resilience to the driven element, sleeve 21 maintains the cylindrical outer shape, and rim 20 affords a good friction surface engaging capstan 11. Pinch roll 12 presses against the outer surface of sleeve 21 to urge the inside of rim 20 forcefully against capstan 11 to maintain a good driving contact.

A pulley 22 is arranged on shaft 18 above hub 19 and drives an O-ring belt 23 to pulley 24 on shaft 25. Friction roller 16 is mounted on shaft 25 and extends into slot 13 for driving card 15 against magnetic head 14 as previously described. Pulley 24 preferably has a relatively large mass to serve as a fly wheel dampening out vibration, and elastomeric hub 19 also reduces some potential vibration.

The resulting drive has a fairly large contact area with capstan 11 for a relatively powerful grip and high troque necessary for advancing card 15 through slot 13. Pulleys 22 and 24 are sized for a speed reduction so that friction roller 16 has a surface speed substantially slower than the surface speed of capstan 11. This moves card 15 slowly and evenly along slot 13 to provide a relatively long message time for a relatively short linear track.

The inventive driving element with its elastomeric hub 19, rim 20, and sleeve 21, can be used in adapters removably insertable into a cassette tape recorders to accomplish different ultimate operations. Once the inventive driven element is turned steadily with capstan 11, it can turn many different drive trains to operate an adapter for tape play, rotatable display, a phonograph or magnetic disk turntable, rotating drum, etc. in addition to a linear drive. Furthermore, instead of a belt and pulley drive leading from the driven element, gears, friction wheel drives, and other drive trains can be operated according to the invention. Also, the resulting drive train, even when applied to a linear play adapter, does not necessarily need a speed reduction, and for some linear play applications, a speed increase is preferred. Hence, the inventive drive has many advantages for an adapter to be removably plugged into a cassette tape recorder to take off power for any sort of drive from the capstan of the host recorder.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will appreciate the changes in materials and configurations possible in applying the invention to various adapters for linear play.

I claim:

1. A drive for an adapter removably insertable in a tape recorder having a capstan and a pinch roller, said drive comprising:

a. a driven element including a shaft rotatably supported on said adapter;
b. a resilient elastomeric hub fixed to said shaft and extending radially outwardly from said shaft;
c. a substantially rigid cylindrical sleeve secured to the periphery of said elastomeric hub and extending axially from said elastomeric hub;
d. a layer of friction material on the inside of said axial extent of said cylindrical sleeve;
e. drive means turned by said driven element for operating said adapter; and
f. said elastomeric hub and said cylindrical sleeve being configured so said sleeve is engaged by said pinch roller to press said friction material aganist a substantial length of said capstan with said sleeve providing uniform and unyielding control of the speed transfer from said capstan and said elastomeric hub flexing to accommodate any discontinuity of said capstan and said pinch roller relative to said shaft while transmitting true capstan speed without variation.

2. The drive of claim 1 wherein said drive means includes a belt and pulley dimensioned for speed reduction.

3. The drive of claim 1 wherein said drive means includes a rotatable element with a substantial mass to serve as a flywheel.

4. The drive of claim 1 wherein said friction material is formed of the same elastomeric material forming said hub.

5. The drive of claim 1 wherein said adapter is for linear play and has a linear drive slot.

6. the drive of claim 5 wherein said drive means includes a friction drive roller approximately tangent to said linear drive slot and means for pressing a linear recording element against said friction roller for traversing said slot.

7. The drive of claim 6 wherein said means for pressing said linear element against said friction roller is a magnetic head spring biased against said friction roller.

8. The drive of claim 7 wherein said friction material is formed of the same elastomeric material forming said hub.

9. The drive of claim 8 including a belt and pulley drive dimensioned so that the surface speed of said friction roller is substantially less than the surface speed of said capstan.

10. The drive of claim 9 wherein a pulley in said belt and pulley drive means has a substantial mass to serve as a flywheel.

* * * * *